April 10, 1951  W. E. McDONALD  2,547,956
DOCK PLATE
Filed April 16, 1945
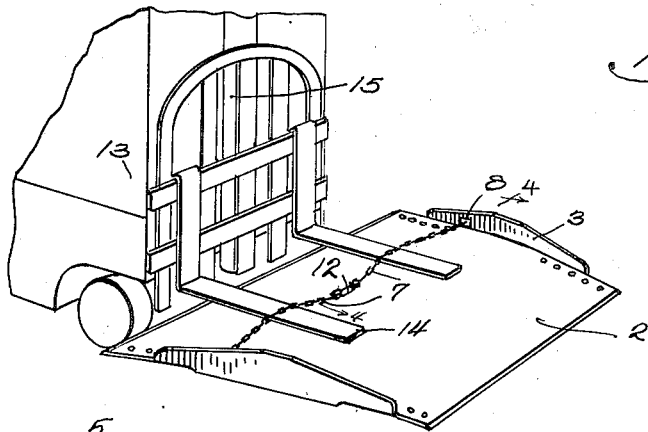
Fig. 1
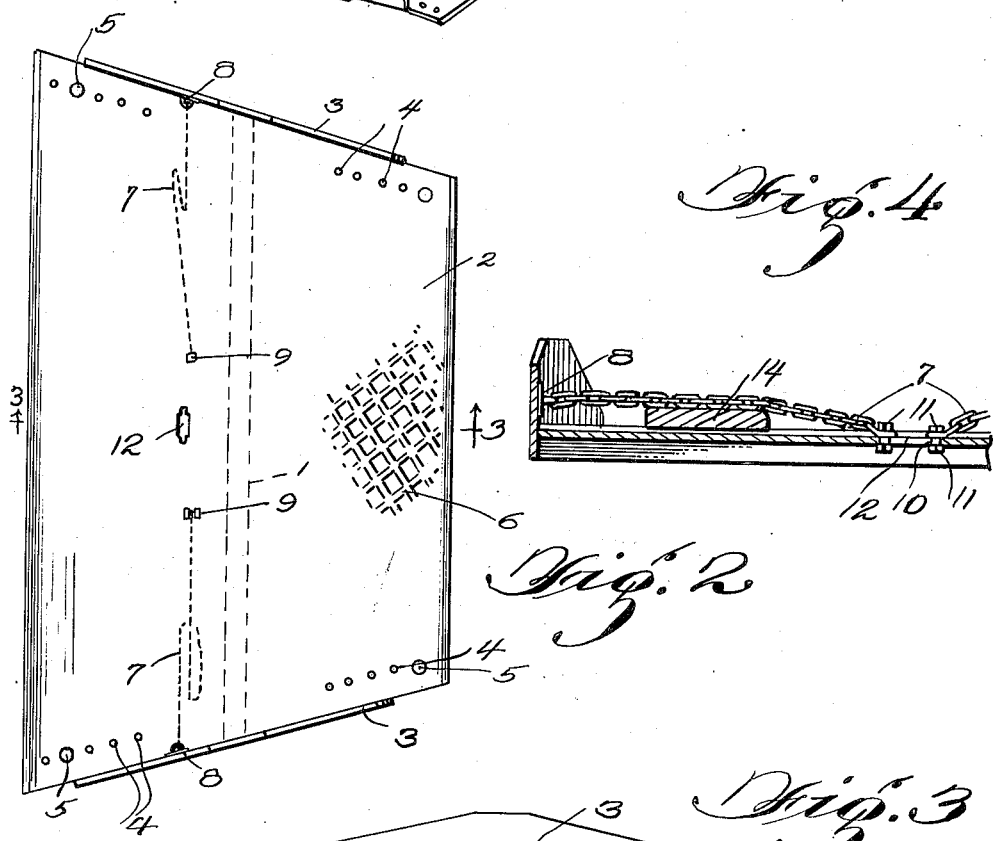
Fig. 4
Fig. 2
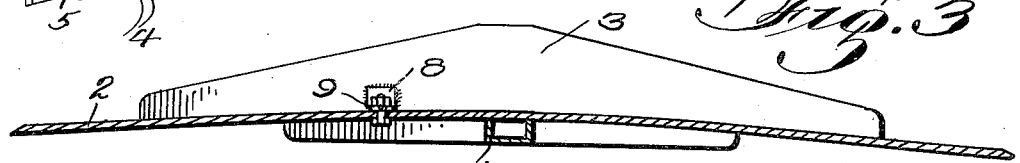
Fig. 3
INVENTOR.
William E. McDonald
BY
William F. Desmond
ATTORNEY Patented Apr. 10, 1951

2,547,956

UNITED STATES PATENT OFFICE 2,547,956

DOCK PLATE

William E. McDonald, Salt Lake City, Utah

Application April 16, 1945, Serial No. 588,510

3 Claims. (Cl. 14—72)

(Granted under the act of March 3, 1883, as amended April 30, 1928; 370 O. G. 757)

The invention described herein, if patented, may be manufactured and used by or for the Government for governmental purposes, without the payment to me of any royalty thereon.

This invention relates to car plates of the type used to bridge the gap between the floor of railway freight cars and warehouse docks and the like.

An object of this invention is to provide a car plate capable of supporting loads of considerable weight.

Another object is to provide a car plate which is constructed so that the weight of the load to which it is subjected is distributed from the point of application to the side members, and thence to the loading platform or dock and the floor of the freight car.

A further object is to provide a car plate which is constructed so that the effect of the relative difference in height between the car floor and the warehouse dock is minimized.

Another object is to provide a car plate which is constructed so that the danger of accidents at or near the car plate during the movement of matériel thereover is minimized.

Another object is to provide a car plate which will not shift when a load is moved thereover.

Another object is to provide a car plate which can be moved into and out of position with ease.

Another object is to provide a car plate which will possess the above-mentioned advantages and at the same time be light in weight.

Further objects, advantages and features will be apparent from the following specification when read in conjunction with the accompanying drawing in which:

Fig. 1 is a perspective of the car plate of my invention in position to be moved by a fork-lift truck.

Fig. 2 is a top plan view of the car plate.

Fig. 3 is a section thereof taken along the line 3—3 of Fig. 2.

Fig. 4 is a fragmentary transverse section taken along the line 4—4 of Fig. 1.

In the movement of matériel into and out of freight cars, considerable difficulty has usually been experienced in providing a suitable car plate for bridging the gap between the car floor and the dock or warehouse floor. The relative difference between the height of the car floor and the floor of the warehouse often varies from car to car. In large warehouses where more than one railway siding is available, the distance between the edge of the warehouse floor and the edge of the car floor at one siding is very often different from the corresponding distance at another siding. Therefore, one of the objects of this invention is to provide a car plate which will serve its purpose efficiently and facilitate the speedy and safe flow of matériel from car to dock and vice versa under varying circumstances of the type mentioned above.

The car plate of my invention is relatively light in weight and easy to handle, yet at the same time it is capable of supporting loads of considerable weight. The main feature of my invention, as shown in Figures 2 and 3, lies in the use of a support beam, preferably flanged such as channel support 1, running transversely across the center of the lower face of a cambered car plate 2, and having the extremities thereof attached to side members 3, thereby distributing the load from the point of maximum deflection and bending, the center of the span, to the side members, which, in turn distribute the load to the railroad car and the platform. I have found that this particular structure results in a distribution of the load which is not obtainable in other car plates which have several reinforcing members running longitudinally or transversely or both on the under side of the plate but which are attached only to the car plate.

This disposition of the channel support 1 insures a relative unobstructed underside of the plate 2, by reason of the location of said support clear of the end portions of plate 2; in order to facilitate stacking of the car plate for storage, the height of channel support 1 preferably should not exceed the camber of the plate, that is the vertical distance between the respective planes of the ground-engaging edges and of the lower face of the center portion of the plate. This absence of obstructions is a highly desirable feature because it permits the person loading or unloading the railroad car to select the exact position in which desires to locate the car plate. For example, under one set of circumstances it might be more desirable to have the greater portion of the car plate on the loading platform or dock. Under other circumstances it might be more desirable to have the greater portion of the car plate inside the railroad car. This adaptability is not obtainable when car plates having a plurality of reinforcing members located on the underside are used.

The car plate is in the form of an isosceles trapezoid with the parallel sides beveled to eliminate horizontal wheel thrust against the car plate. I have found that a car plate of this particular configuration is highly desirable because it considerably reduces displacement of the plate, a condition which is quite prevalent when conventional car plates are used. Displacement is further reduced by providing a plurality of bolt holes 4 in the car plate 2 to receive retainer bolts 5. The bolts 5 are inserted in the holes which are in register with the edge of the dock or platform and the edge of the railroad car floor. Shifting of the car plate during the movement of matériel thereover is quite disconcerting to the workmen. It is a distinct safety hazard. The safety of the workmen is endangered and damage to matériel is liable to result. The efficiency of then entire operation is impaired. The car plate of this invention enables matériel to be moved in and out of the freight car speedily, efficiently, and with the possibility of accidents due to displacement of the plate sharply reduced.

The top of the plate 2 is provided with a non-skid or multi-grip surface 6 (Fig. 2) as an added safety factor. Thus the danger of workmen slipping and mechanical equipment skidding on the plate is avoided.

Another feature of this invention, illustrated particularly in Figures 1 and 4, is the attachment provided to facilitate lifting the car plate into and out of position. It comprises flexible connector means extending above the upper face of plate 2 in a direction substantially parallel to the latter's ground-engaging edges, such as two length of chain 7, each having one end thereof attached to a side member 3 at 8, and the free end provided with a hook 9. The hook 9 comprises a stud 10 having a bolt 11 attached to each end thereof. When the car plate is in use the chains 7 are hung over the sides of the side members 3 so as not to interfere with traffic over the car plate 2.

The car plate 2 is provided with an aperture 12, centrally located on the longitudinal axis of the plate and spaced from side members 3, into which the hooks 9 on the free ends of the chains 7 are inserted when it is desired to move the car plate from one position to another. This arrangement for moving the car plate is particularly desirable when, as normally is the case, fork-lift trucks are used in the car loading and unloading operation. The length of the chains 7 is such that when the hooks 9 have been inserted in the slot 12 there is sufficient slack to permit the lifting fingers 14 of a fork-lift truck 13 to be threaded between the chains 7 and the plate 2. The elevating mechanism 15 of the fork-lift truck 13 may then be actuated to raise the plate 2 off the dock and car floor to permit its transfer to some other location. Movement of the car plate in this manner is quicker and safer than manual movement thereof would be.

I claim:

1. A dock plate comprising: a main body; a pair of side members carried by said main body; means for distributing a load between the center region and the outer region of said dock plate, said means comprising a support member extending transversely across the under side of said main body about the center region of said main body, said support member being carried by said main body and having its ends abut against and rigidly connected to said side members; said main body being apertured in a region spaced from said side members, the aperture being centrally located on the longitudinal axis of said main body; and means carried by said main body whereby said main body may be moved by a fork-lift truck, said means comprising a pair of flexible connector means, each having one end thereof attached to one of said side members and the free ends thereof provided with means insertable through said apertured main body for releasably engaging the same.

2. A car plate comprising: a main body having an aperture therein centrally located on the longitudinal axis thereof; a pair of side members carried by said main body; means for distributing a load between the center region and the outer regions of said car plate, said means comprising a support member extending transversely across the under side of said main body about the center region of said main body, said support member being carried by said main body and having its ends abut against and rigidly connected to said side members; and means carried by said main body whereby said main body may be moved by a fork-lift truck, said means comprising a pair of chains, each having one end thereof attached to one of said side members and the free ends thereof provided with means for engaging said main body at the aperture therein.

3. A cambered dock plate comprising: a cambered main body plate having two ground-engaging edges, two inclined end portions, and a raised center portion; a pair of side members carried by said main body; means for distributing a load between the center region and the outer region of said dock plate, said means comprising a support member extending transversely across the lower face of said raised center portion and clear of said end portions of said main body plate, said support member being carried by said main body plate and having its ends abut against and rigidly connected to said side members; said main body plate being apertured in a region spaced from said side members, the aperture being centrally located on the longitudinal axis of said main body plate; and means carried by said main body plate whereby said main body may be moved by a fork-lift truck, said means comprising a pair of flexible connector means, each having one end thereof attached to one of said side members and the free ends thereof provided with means insertable through said apertured main body plate for releasably engaging the same.

WILLIAM E. McDONALD.

REFERENCES CITED

The following references are of record in the file of this patent:

UNITED STATES PATENTS

| Number | Name | Date |
| --- | --- | --- |
| 221,931 | McCoy | Nov. 25, 1879 |
| 1,137,645 | McCormick | Apr. 27, 1915 |
| 1,168,983 | Wallingford | Jan. 18, 1916 |
| 1,358,951 | Helmich | Nov. 16, 1920 |
| 1,359,835 | Pease | Nov. 23, 1920 |
| 1,633,020 | Ingram | June 21, 1927 |
| 1,882,512 | Lovejoy | Oct. 11, 1932 |
| 2,226,502 | Platt | Dec. 24, 1940 |
| 2,284,022 | Schmeller, Sr. | May 26, 1942 |
| 2,329,855 | Rydner | Sept. 21, 1943 |
| 2,337,138 | Van Berg | Dec. 21, 1943 |
| 2,452,289 | Bryson | Oct. 26, 1948 |

OTHER REFERENCES

Bulletin "Penco Safety Type Bridge Ramps," manufactured by Pallet Engineering Co., 725—2nd St., San Francisco, Calif. Eng. Bulletin 470. (Copy received Aug. 23, 1948 in Div. 33.)